United States Patent [19]
Kim et al.

[11] Patent Number: 5,679,288
[45] Date of Patent: Oct. 21, 1997

[54] BLEND OF POLYPHOSPHATE FLAME RETARDANT AND LIQUID CRYSTALLINE ADDITIVE

[75] Inventors: Ki-Soo Kim, Katonah, N.Y.; Sophia Dashevsky, Fair Lawn, N.J.; Alan Aaronson, Flushing Meadows; Johst Herman Burk, Mohegan Lake, both of N.Y.

[73] Assignee: Akzo Nobel nv, Arnhem, Netherlands

[21] Appl. No.: 671,224

[22] Filed: Jun. 27, 1996

[51] Int. Cl.$^6$ .......................... C09K 21/12; C09K 21/14; C09K 19/52

[52] U.S. Cl. ............... 252/609; 252/299.01; 252/299.6; 252/299.61; 252/299.64; 524/128; 524/132; 524/136; 137/13

[58] Field of Search .................... 252/609, 299.01, 252/299.6, 299.61, 299.64, 299.66; 524/128, 132, 136; 137/13

[56] References Cited

U.S. PATENT DOCUMENTS

| | | | |
|---|---|---|---|
| 4,950,360 | 8/1990 | Murao et al. | 156/668 |
| 4,952,334 | 8/1990 | Hakemi et al. | 252/299.01 |
| 5,194,569 | 3/1993 | Kim et al. | 528/206 |
| 5,258,486 | 11/1993 | Kim et al. | 528/206 |
| 5,346,970 | 9/1994 | Dashevsky et al. | 525/444 |
| 5,418,299 | 5/1995 | Kim et al. | 525/400 |
| 5,457,221 | 10/1995 | Brady et al. | 558/99 |

FOREIGN PATENT DOCUMENTS

| | | | |
|---|---|---|---|
| 411866 | 2/1991 | European Pat. Off. | C08K 5/524 |

OTHER PUBLICATIONS

Derwent Patent Abstract 95-190899/25 (1995).
Derwent Patent Abstract 95-190900/25 (1995).
Derwent Patent Abstract 95-293521/39 (1995).
Derwent Patent Abstract 93-216998/27 (1993).

*Primary Examiner*—Joseph D. Anthony
*Attorney, Agent, or Firm*—Richard P. Fennelly; Louis A. Morris

[57] ABSTRACT

The disclosure teaches a blend of a predominant amount of a polyphosphate flame retardant and an effective amount of a liquid crystalline additive for viscosity reduction and compatibilization when blended with a thermoplastic polymer, as compared to use of just the polyphosphate flame retardant alone. The polyphosphate can comprise resorcinol bis(diphenyl phosphate) and/or its higher oligomers. The liquid can be a liquid crystalline segmented block copolymer or a liquid crystalline oligomer.

9 Claims, No Drawings

BLEND OF POLYPHOSPHATE FLAME RETARDANT AND LIQUID CRYSTALLINE ADDITIVE

BACKGROUND OF THE INVENTION

Certain disclosures exist in the prior art which relate to compositions containing a blend of an organophosphorus composition and far larger amounts of a liquid crystalline composition. Included are the following:

1. Canadian Patent No. 2,138,728 describes a composition comprising 100 parts by weight of a resin which is a blend of liquid crystalline polyester and polyalkylene terephthalate and up to 5 parts by weight of a phosphorus ester, such as pentaerythritol phosphite;

2. European Patent Publication No. 411,866 describes a composition containing a predominant amount (over 95 wt %) of a liquid crystalline polyester and up to 5 wt % of a phosphorus ester compound, which is preferably a phosphite;

3. Japanese Patent Publication No. 05/140,423 describes a composition containing 100 parts by weight of a liquid crystalline polyester and up to about 5 parts by weight of a phosphonite compound;

4. Japanese Patent Publication No. 07/109,406 describes a composition containing 100 parts by weight of a liquid crystalline polyester and up to about 30 parts by weight of an organophosphorus compound; and 5. Japanese Patent Publication No. 07/109,406 describes a composition containing 100 parts by weight of a liquid crystalline polyester, up to about 30 parts by weight of an organophosphorus compound, and up to about 30 parts by weight of an organonitrogen compound.

Polyphosphates are being used as flame retardant additives for thermoplastics such as polyethylene terephthalate, polybutylene terephthalate, polycarbonates, and the like. Often, the use of these flame retardant additives is limited due to incompatibility with matrix polymers and exudation during melt blending processes. It has been unexpectedly found that the addition of an effective amount of a liquid crystalline additive to the polyphosphate improves the compatibility of the polyphosphate with the thermoplastic polymer matrix, as compared to systems not containing the liquid crystalline additive, and also reduces the melt viscosity of the polyphosphate/thermoplastic polymer blend, as compared to the use of just the polyphosphate additive alone.

SUMMARY OF THE INVENTION

The present invention relates to a blend of a predominant amount of a polyphosphate flame retardant and an effective amount of a liquid crystalline additive for the above-described viscosity reduction and compatibility advantages, as compared to use of only the polyphosphate, when added to a thermoplastic polymer.

DESCRIPTION OF THE PREFERRED EMBODIMENTS

The polyphosphate flame retardant additive which contains a bridging unit between the phosphate moieties therein which is derived from an arylene-containing diol, in a preferred embodiment, has the general formula

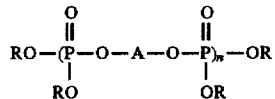

where R is either unsubstituted or substituted aryl, A is a bridging group containing an alkylene group, one arylene ring, two arylene rings either joined directly to each other or by an alkylene bridging group, and n ranges from 1 to about 10. In the foregoing formula A can be monoarylene, such as would be derived from resorcinol or hydroquinone, or biarylene with an alkylene bridging group between the two aryl rings, such as derived from bisphenol A. In the case of mixtures of such polyphosphates, the value of n in the formula will usually be a decimal value within the above numerical range. Such polyphosphates can, for example, be "bis" phosphates, where "n" in the formula is 1, or oligomeric phosphates, where "n" is 2 or higher. Mixtures of such polyphosphates can be used. In the composition of the present invention, such polyphosphates can generally be present at from about 50% to about 95%, by weight of the entire composition. U.S. Pat. No. 5,457,221 to B. L. Brady et al. describes a preferred class of such polyphosphate (such as, the polyphosphate comprising resorcinol bis(diphenyl phosphate) and/or its higher oligomers), describes a preferred manner in which they can be made, and also describes how the oligomer content of the resulting polyphosphate can be altered by appropriate control of the starting reagents.

One type of liquid crystalline additive which, when added to the forgoing type of polyphosphate flame retardant additive to achieve the novel blend of the present invention, is the type of liquid crystalline segmented block copolymer that is described in copending U.S. Ser. No. 53,838, filed Apr. 28, 1993 and in PCT International Publication No. WO 93/01238, Jan. 21, 1993. This segmented block copolymer comprises "rod" and "flexible coil" blocks, respectively. Such a liquid crystalline segmented block copolymer, which is intended to be added to the polyphosphate flame retardant, can be envisioned to have the general formula:

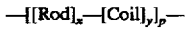

where "Rod" indicates the mesogenic block with x, normally from 2 to 15, indicating the number of mesogen repeats, "Coil" indicates the block comprising a flexible coil polyester segment, for example, with y, normally from about 2 to about 25, indicating the number of repeat units in the flexible polyester block, and p representing the repeat units of rod and coil blocks. The mole % rod in the total polymer can range from about 4% to about 80%. The repeat unit p can range from about 1 to about much larger numbers such as 50-500 for high molecular weight segmented block copolymers. Polyethylene terephthalate or polybutylene terephthalate comprise the preferred coil segments. The rod length, which is responsible for liquid crystalline properties for the block copolymer additive and the % block in the matrix/block copolymer combination need to be appropriately balanced within the general ranges given above.

Generally speaking, the amount of the liquid crystalline copolymer which can be added in accordance with the present invention can range from 5% to about 50%, by weight of the polyphosphate flame retardant and liquid crystalline additive.

The type of mesogenic unit for the rod portion of the aforementioned type of segmented block copolymer can be appropriately selected from known mesogenic units (main chain thermotropic liquid crystal polymers) including those of the general structure:

[—A—Y—X—Z—]$_m$ (I)

as set forth in U.S. Pat. No. 4,952,334, for example, which is incorporated herein by reference. In the above formula, for example, in preferred embodiments, X can be $(CH_2)_n$, where n is an integer of from 2 to 10, m can range from about 5 to about 15, and Y and Z can each be —C(O)O— or —C(O)NH— or can be a single bond between two carbon atoms, and A can be p-phenylene, 1,4-, 2,6-, or 1,5-naphthalene, monosubstituted phenylene with methyl, chloro, or phenyl substitution; —ArCH=CHAr—, where Ar is a phenyl ring, —AR— C(O)OAr—, —Ar—C(O)NHAr—, or —ArOC(O)—Ar—C(O)O—Ar—, as more fully depicted in the aforementioned patent. In addition another mesogenic unit which can be employed has the structure —Ar—C(O)—NH—Ar—NH—C(O)—Ar—. The commercial rod polymers based on oxybenzoate units, 4,4'-biphenylene terephthalate units, and oxynaphthalene carboxylate units (the latter two including copolymers with the oxybenzoate units) can be especially preferred.

A particularly preferred structure for the "Rod" or mesogenic unit is of the general type described by Ober et al. in Polymer Journal, Vol. 14, No. 1, pp. 9–17 (1982) and, in view of its presence in a block copolymer, as contrasted to the Ober et al. homopolymer, has the structure:

—[—OArC(O)O(CH$_2$)$_n$OC(O)ArOC(O)ArC(O)—]—$_x$ where Ar represents phenyl with para- bond sites, n can range from 2 to 10, e.g., 4 and x can range, for example, from about 5 to about 15. These mesogenic units can be characterized as aromatic ester mesogenic units containing a flexible alkylene spacer. The "triad" structure comprising three linearly-aligned aromatic rings, the bis(p-carboxyphenyl) terephthalate moiety, and a flexible spacer of varying length (n), which can be alkylene or alkylene with heteroatom (e.g., oxygen) interruption, is particularly preferred as depicted above. The mesogenic units generally contain "diad" or "dyad" linkages, —OC(O)ArOC(O)ArC(O)—, at either end adjacent the connection points with the coil block segments, in general, the block copolymers described herein will have a molecular weight of no less than about 7,000 to about 8,000.

Although the particular thermotropic LCP block (e.g., triad with flexible spacer block and polyester block) of structure (I), above, is not a true rigid-rod, it readily assumes an extended chain structure and forms nematic mesophases and consequently high modulus/strength structures. Ideally, the high strength chain extended block polymer molecules would be very finely dispersed in the PET matrix and would be expected to have potential as a high performance molecular composite material.

The foregoing type of thermotropic liquid crystal block copolymer can be synthesized by the process shown in U.S. Ser. No. 53,838, filed Apr. 28, 1993. In the initial step, oligomers of the mesogen are prepared in one reactor and oligomers of the selected polyester are prepared in a second reactor, each set of oligomers having appropriate complementary end groups for later reaction of each set of oligomers. Then, the previously formed oligomers are allowed to react to one another to form the desired block copolymer. In this type of procedure, the sizes of the respective oligomers controls the lengths of the respective blocks.

More preferably, it is synthesized by the one reactor process described and claimed in U.S. Pat. No. 5,194,569, which is incorporated herein by reference. In this one reactor process an α,ω-bis(hydroxybenzoyloxy) alkane is the preferred reagent for reaction with an aromatic acid chloride to form a functionalized liquid crystal oligomer containing the desired mesogenic unit or units and then reacting this oligomer with either a chosen polyester oligomer or the reagents for synthesizing such a polyester oligomer.

The most preferred synthesis procedure is described in U.S. Pat. No. 5,258,486 in which an α,ω-bis (hydroxybenzoyloxy) alkane monomer is reacted with an aromatic acid chloride in the presence of a functionalized flexible coil oligomer under two differing temperature conditions to initially form an acid chloride-terminated bis (hydroxyalkyl terephthalate) oligomer at a first, lower temperature and the desired block copolymer at a second, higher temperature.

In addition to the foregoing type of liquid crystalline copolymer additive, it is within the contemplation of the present invention to utilize the thermotropic liquid crystalline oligomer described and claimed in U.S. Pat. No. 5,418,299, which is incorporated herein by reference. This liquid crystal oligomer is one which, unlike the segmented block copolymer systems Just described, is essentially mesogenic in character. It does not contain segments which are similar to the much higher molecular weight, flexible coil polymer blocks contained in that type of segmented liquid crystalline block copolymer. These oligomers are also of generally lower molecular weight than conventional liquid crystalline polymer additives, having a weight average molecular weight of only up to about 7,000, namely from about 1,000 to about 6,000, preferably from about 1,500 to about 4,000.

The present oligomers contain linear polyalkylene spacers rather than comprising wholly cyclic structures (i.e., cycloalkyl, aromatic, etc.). The term "polyalkylene" as used herein is intended to embrace both conventional polyalkylene units, —(CH$_2$)$_n$—, as well as units comprising these structures which also have oxygen atom interruption. The T$_g$ of the instant oligomers falls below that of liquid crystalline oligomers thereby allowing for thermal mixing of the instant oligomer additive with the substrate resins in the claimed blends at lower temperature.

The type of mesogenic unit for the rod portion of the LC oligomer can be appropriately selected from known mesogenic units in main chain thermotropic liquid crystal polymers, with the proviso that the molecular weight be controlled to yield an oligomer rather than a polymer. Included are those of the general structure:

[—A—Y—X—Z—]$_m$ (I)

as set forth in U.S. Pat. No. 4,952,334, for example, which is incorporated herein by reference. In the above formula, for example, in preferred embodiments, X (the "polyalkylene" spacer) can be $(CH_2)_n$ and $(CH_2CH_2O)_n$, where n is an integer of from 2 to 10, m can range from about 2 to about 10, and Y and Z can each be —C(O)O— or —C(O)NH— or can be a single bond between two carbon atoms, and A can be p-phenylene, 1,4-, 2,6-, or 1,5-naphthylene, monosubstituted phenylene with methyl, chloro, or phenyl substitution; —ArCH=CHAr—, where Ar is a phenyl ring, —Ar—C(O)OAr—, —Ar—C(O)NHAr—, or —ArOC(O)—Ar—C(O)O—Ar—, as more fully depicted in the aforementioned patent. In addition, another mesogenic unit which can be employed has the structure —Ar—C(O)—NH—Ar—NH—C(O)—Ar—. Yet another mesogenic unit can have the formula —ArC(O)OAr'OC(O)Ar— where Ar' can be unsubstituted or substituted (e.g., alkyl or alkoxy) phenyl (derived from hydroquinone) or biphenyl (derived from biphenol) and Ar can be derived from terephthalic or the mesogenic-producing naphthylenic starting materials. The commercial rod polymers based on oxybenzoate units, 4,4'-biphenylene terephthalate units, and oxynaphthalene carboxylate units (the latter two including copolymers with the oxybenzoate units) can be especially preferred.

A particularly preferred oligomer has the repeat unit

—[(CH$_2$)$_n$OC(O)ArOC(O)ArC(O)OArC(O)O]— where n can range from 2 to 10, preferably 4, and Ar are para-phenylene.

In the blends of the present invention it is contemplated that the oligomer can be added in similar amounts to those contemplated above for the liquid crystalline copolymer.

The oligomers used in the blends of the present invention can be synthesized, for example, by reacting the appropriate building blocks for the desired mesogen (e.g., a terephthaloyl halide and an α-ω-bis(p-hydroxybenzyl-oxy)alkane) with a slight molar excess of one building block over the other using single digit molar amounts of each, e.g., 4/3 to 7/6. The use of substantially equal molar amounts of reagent will yield excessively large molecular weight materials (i.e. polymers) as will the use of high molar amounts of reagents.

The Examples which follow further illustrate various embodiments of the present invention.

EXAMPLES 1–3

These Examples illustrate the enhanced thermostability performance in a predominantly bis(phosphate) flame retardant-containing composition which comprises a segmented liquid crystalline block copolymer of the type described as an additive for polyethylene terephthalate resin in the U.S. Pat. No. 5,346,970. The liquid crystalline block copolymer contained mesogenic segments (as depicted at Col. 3, lines 3–10 of U.S. Pat. No. 5,346,970) comprising three para- linked aromatic rings and a flexible polybutylene spacer (the so-called "triad-4" or "TR-4" structure where the term "triad" refers to the three aromatic rings and the "4" refers to the carbon change length of the spacer), and flexible core segments of polybutylene terephthalate (or "PBT"). This block copolymer had an intrinsic viscosity of 0.46 dl/g.

In the description that follows, the following abbreviations are used:

TR-4/PBT: the above-mentioned liquid crystalline block copolymer (also referred to as "LCP" below).

RDP: resorcinol bis(diphenylphosphate).

PBT: poly(butylene terephthalate) resin.

PET: poly(ethylene terephthalate) resin.

When the isothermal TGA curves (at 260° C./30 minutes) in air of RDP, the LCP alone, and an LCP-containing RDP blend (2 wt % LCP) were compared, it was noted that the thermostability of the LCP was superior as compared to that of the RDP. Addition of a small amount (e.g., about 2 wt %) of the TR-4/PBT liquid crystalline block copolymer to the RDP greatly improved the thermostability of the RDP. After thirty minutes exposure at 260° C. the weight losses of LCP, RDP, and RDP blend which contained 2% of the LCP were 0.6%, 6% and 3%, respectively.

EXAMPLES 4–8

These Examples illustrate the melt flow index (MFI) of a series of materials either entirely based on PBT resin or of other compositions containing PBT resin.

The effect, for example, of the LCP on the MFI of RDP-containing PBT is summarized in Table 1 given below.

The MFI was measured at 260° C. at a load of 2160 g. The data indicate that the melt viscosity of the RDP-containing PBT composition was significantly reduced by addition of a small amount of the LCP. A 45% increase in the MFI of PBT was achieved by addition only 3 parts per hundred (pph) of RDP and LCP each. By comparison, the PBT containing 5 pph LCP showed a smaller effect, i.e., a 36% increase of MFI. Thus, the combination of RDP and LCP provides a positive effect on the reduction of melt viscosity of PBT.

TABLE 1

| MFI data of the PBT blends | | | |
|---|---|---|---|
| Sample | Composition, pph | MFI, g/10 min | Increase, % |
| PBT (Control) | — | 22 | — |
| PBT/RDP | 100/15 | 39 | 77 |
| PBT/LCP | 100/5 | 30 | 36 |
| PBT/RDP/LCP | 100/15/5 | 47 | 114 |
| PBT/RDP/LCP | 100/3/3 | 32 | 45 |

The addition of the LCP did not affect the thermal properties of the PBT/RDP blend. For example, DSC thermograms of the PBT/RDP and PBT/RDP/LCP blends were similar.

Also, SEM micrographs of the PBT/RDP blend revealed a somewhat irregular morphology with rather large agglomerates suggesting a second globular phase. The PBT blend containing the RDP/LCP binary additive showed a smoother morphology without phase separation. The LCP appeared to act as a surface modifier improving the interfacial adhesion between the PBT and RDP.

EXAMPLES 9–11

These Examples present analogous MFI data to that presented in Examples 4–8 with PET-containing, rather than PBT-containing, samples.

The MFI data of the PET blends were measured at 260° C. (load=2160 g) and are given in Table 2. Analogous to the results obtained from the PBT-containing systems, an addition of RDP drastically reduced the melt viscosity of PET, but the effect was even bigger in the systems tested in these Examples. Addition of the LCP resulted in a further increase of MFI.

TABLE 2

| MFI data of the PET blends | | | |
|---|---|---|---|
| Sample | Composition, pph | MFI, g/10 min | Increase, % |
| PET (Control) | — | 22 | — |
| PET/RDP | 100/15 | 95 | 239 |
| PET/RDP/LCP | 100/15/5 | 120 | 330 |

Unlike the PBT-containing samples of the previous Examples, the thermal behavior of PET was altered by an addition of RDP. The heating thermogram of RDP-containing PET exhibited a shoulder on a major endothermic transition. This may suggest the existence of non-uniform PET crystals. The shoulder was hardly seen on the thermogram of the ternary PET/RDP/LCP blend. Thus, the addition of the LCP (at 5 pph) positively affected the morphology of the PET/RDP blend. Table 3 sets forth a summary of the data from the DSC testing of the enumerated blends.

TABLE 3

DSC data of the PET/RDP and PET/RDP/LCP blends

| Sample | $T_g$, °C. | $T_M$, °C. | $\Delta H_m$, J/g | $T_c$, °C. | $-\Delta H_c$, J/g |
|---|---|---|---|---|---|
| PET/RDP | 49 | 251 | 42 | 186 | 61 |
| PET/RDP/LCP | 52 | 251 | 46 | 179 | 55 | where:
$T_g$ — glass transition temperature
$T_m$ — melting temperature recorded during second heating
$T_c$ — crystallization temperature
$\Delta H_m$ — heat of fusion
$\Delta H_c$ — heat of crystallization The ternary PET/RDP/LCP blend crystallized at a slightly slower rate and had a lower crystallization temperature as compared to the binary PET/RDP blend.

EXAMPLES 12–15

These Examples, unlike Examples 4–11, describe certain MFI data for polycarbonate ("PC")-containing samples, rather than for polyester-containing samples.

The MFI data of the PC blends, measured at 300° C. (load=1200 g), is given in Table 4.

TABLE 4

MFI data of the PC blends

| Sample | Composition, pph | MFI, g/10 min | Increase, % |
|---|---|---|---|
| PC (Control) | — | 7 | — |
| PC/RDP | 100/15 | 26 | 270 |
| PC/RDP/LCP | 100/15/5 | 31 | 343 |
| PC/RDP/LCP | 100/3/3 | 11 | 57 |

The data indicate that the melt viscosity of PC was greatly reduced by an addition of the RDP. Furthermore, the effect was even greater in the presence of a small amount of the TR-4/PBT copolymer.

DSC thermograms displayed amorphous blends. The RDP-containing PC had a significantly lower $T_g$ of 99° C. as compared to the neat PC. The ternary PET/RDP/LCP blend showed a slightly lower $T_g$ of 94° C.

The foregoing Examples should not be construed in a limiting sense since they are merely intended to describe certain embodiments of the present invention. The Claims which follow indicate the intended scope of the present invention.

We claim:

1. A flame retardant blend comprising a predominant amount of a polyphosphate flame retardant of the formula

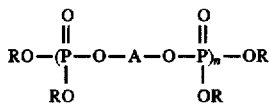

where R is either unsubstituted or substituted aryl, A is selected from the group consisting of a bridging group containing an alkylene group, one arylene ring, and two arylene rings either joined directly to each other or by an alkylene bridging group, and n ranges from 1 to about 10 and an effective amount, for viscosity reduction and enhancement of compatibility, when present in a thermoplastic polymer, of a liquid crystalline additive selected from the group consisting of a liquid crystalline copolymer, a liquid crystalline oligomer, and a mixture of the liquid crystalline copolymer and the liquid crystalline oligomer.

2. A blend as claimed in claim 1 wherein the polyphosphate flame retardant comprises resorcinol bis(diphenyl phosphate), its higher oligomers, and mixtures thereof.

3. A blend as claimed in claim 1 wherein the polyphosphate flame retardant is present at up to about 95%, by weight of the blend.

4. A blend as claimed in claim 1 wherein the liquid crystalline additive is present at from about 5% to less than 50%, by weight of the blend.

5. A blend as claimed in claim 1 wherein the polyphosphate flame retardant is present at up to about 95%, by weight of the blend and the liquid crystalline additive is present at from about 5% to less than 50%, by weight of the blend.

6. A blend as claimed in claim 1 wherein the polyphosphate flame retardant is present at up to about 95%, by weight of the blend and comprises resorcinol bis(diphenyl phosphate), its higher oligomers, and mixtures thereof, and where the liquid crystalline additive is present at from about 5% to less than 50%, by weight of the blend and is a liquid crystalline segmented block copolymer.

7. A blend as claimed in claim 6 wherein the liquid crystalline additive is a liquid crystalline segmented block copolymer of the formula:

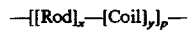

where ,"Rod" indicates the mesogenic block, with x ranging from 2 to 15, and indicating the number of mesogen repeats, "Coil" indicates the block comprising a flexible coil polyester segment with y ranging from about 2 to about 25 and indicating the number of repeat units in the flexible polyester block, and p, which ranges from 1 to about 500, representing the repeat of rod and coil blocks.

8. A blend as claimed in claim 1 wherein the polyphosphate flame retardant is present at up to about 95%, by weight of the blend and comprises resorcinol bis(diphenyl phosphate), its higher oligomers, and mixtures thereof, and where the liquid crystalline additive is present at from about 5% to less than 50%, by weight of the blend and is a crystalline oligomer.

9. A blend as claimed in claim 8 wherein the liquid crystalline additive is a liquid crystalline oligomer of the formula:

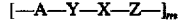

where X is selected from the group consisting of $(CH_2)_n$ and $(CH_2CH_2O)_n$, where n is an integer of from 2 to 10, m is from about 2 to about 10, and Y and Z are each selected from the group consisting of —C(O)O— and —C(O)NH— or can be a single bond between two carbon atoms, and A is selected from the group consisting of p-phenylene, 1,4-naphthylene, 2,6-naphthylene, and 1,5-naphthylene, monosubstituted phenylene with methyl, chloro, or phenol substitution, —ArCH=CHAr—, where Ar is a phenyl ring, —Ar—C(O)OAr—, —Ar—C(O)NHAr—, —ArOC(O)—Ar—C(O)O—Ar—, —Ar—C(O)—NH—Ar—NH—C(O)—Ar—, and —ArC(O)OAr'OC(O)Ar—, where Ar' can be unsubstituted or substituted phenyl or biphenyl, and Ar can be derived from terephthalic or the mesogenic-producing naphthylenic starting materials.

* * * * *